R. A. McQUITTY.
METHOD OF MANUFACTURING SHEETS OF EDIBLE GELATIN.
APPLICATION FILED JUNE 20, 1919.
1,347,226.
Patented July 20, 1920.
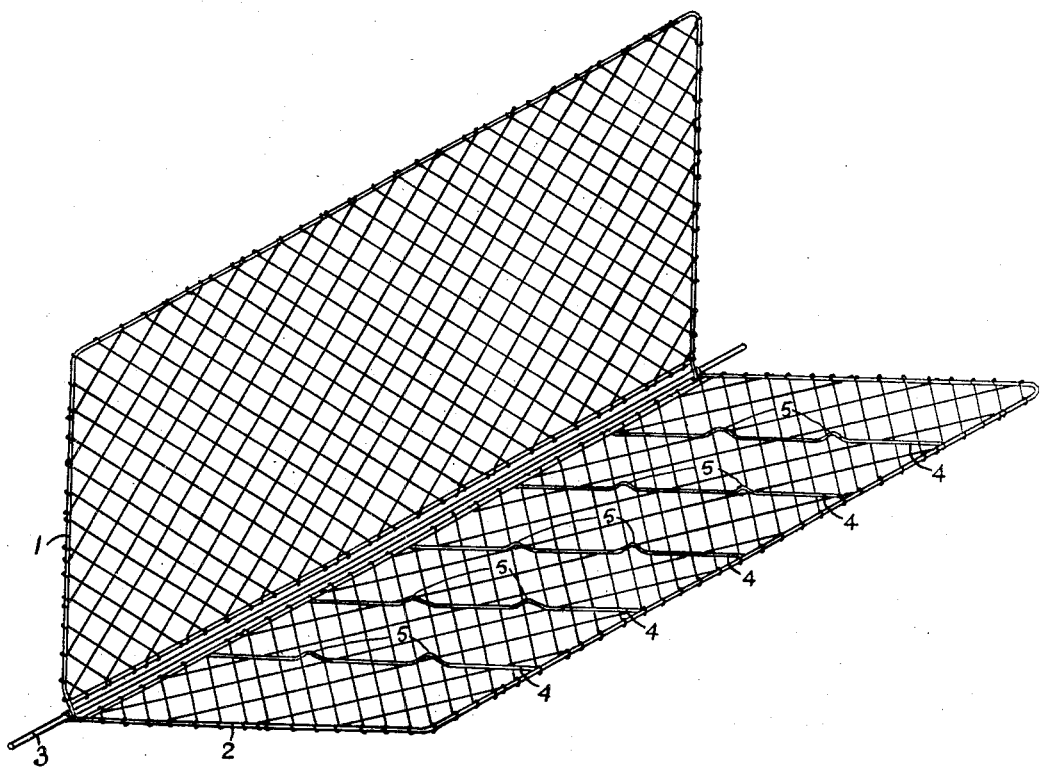
Inventor:-
Robert Atkinson McQuitty.
per Arthur J. Stephens
Attorney.

UNITED STATES PATENT OFFICE.

ROBERT ATKINSON McQUITTY, OF LONDON, ENGLAND.

METHOD OF MANUFACTURING SHEETS OF EDIBLE GELATIN.

1,347,226. Specification of Letters Patent. Patented July 20, 1920.

Application filed June 20, 1919. Serial No. 305,652.

*To all whom it may concern:*

Be it known that I, ROBERT ATKINSON McQUITTY, a subject of the King of Great Britain and Ireland, residing at 10 Parsons Green, in the county of London, England, have invented a new and useful Improved Method of Manufacturing Sheets of Edible Gelatin, of which the following is a specification.

The present invention relates to an improved method of manufacturing sheets of edible gelatin.

The usual method employed for the production of edible sheet gelatin is to cut the sheets from a block of gelatin in a semi-plastic condition. A series of sheets are produced simultaneously from the block by means of a frame with a series of taut wires spaced apart according to the thickness of the sheet required. The semi-plastic sheet thus produced is placed to dry and harden upon a wire netting or twine netting support and thus obtains the crinkled appearance familiar to the public in the edible sheet-gelatin of commerce. The thickness of the gelatin thus produced is governed partly by the quality of the gelatin operated upon and partly by the necessary plastic condition of the sheets when they are placed upon the drying frames and consequently only comparatively thick sheets can be produced.

By the present method of manufacturing edible sheet-gelatin, crinkled sheets can be produced of any desired thickness, length and texture.

According to the present method of manufacture a coating of the desired thickness of liquid gelatin is first spread over a flexible foundation upon which it is dried and then stripped therefrom and then cut into sheets of the desired dimensions. The dried sheets thus produced are placed in a wire netting frame such as the frame shown in the accompanying drawing and dipped momentarily by the operator into a water bath and then placed in a wooden frame to dry in the atmosphere or if desired under the influence of a blower. The finished product has the crinkled form known to the public but owing to its thinness and its clean cut edges, it is much superior to the edible sheet-gelatin produced by the method hitherto in use.

The frame shown in the drawing is formed by the members 1 and 2 hinged to the rod 3. The member 2 is divided on one side by the cross wires 4 arranged at equal distances apart and provided with projections or loops 5. A series of small sheets of gelatin of the same size can be placed between the wires 4 on the member 2 and the member 1, then closed down and held during the subsequent dipping and drying processes by a clip, or the said members can be turned back to back upon a single sheet of gelatin of approximately the same dimensions as said members.

What I claim is:—

1. A method of manufacturing sheets of edible gelatin in which a coating of liquid gelatin is spread over a flexible foundation, dried thereon and the sheet thus produced stripped therefrom and placed in a crinkling frame, then dipped in a bath and finally re-dried in said frame.

2. A method of manufacturing sheets of edible gelatin in which a coating of liquid gelatin is spread over a flexible foundation, dried thereon and the sheet thus produced stripped therefrom and cut into smaller sheets and these sheets placed in wire netting frames and then momentarily dipped in a bath of water and finally re-dried in said frames under the influence of a blower.

3. A method of manufacturing sheets of edible gelatin in which dry sheets of gelatin are placed in a crinkling frame and then dipped in a bath and re-dried in said frame.

4. A method of manufacturing sheets of edible gelatin in which the dry sheets of gelatin are placed between the members of a wire netting frame, momentarily dipped in a bath of water and then re-dried in said frame.

In testimony whereof I sign my name to this specification.

R. A. McQUITTY.